United States Patent [19]

Epenoy et al.

[11] 3,970,798
[45] July 20, 1976

[54] TIME DIVISION MULTIPLEX DATA TRANSMISSION SYSTEM

[75] Inventors: Gabriel Epenoy, Vence; Remi Vautier, Nice, both of France

[73] Assignee: International Business Machines Corporation, Armonk, N.Y.

[22] Filed: Apr. 21, 1975

[21] Appl. No.: 569,718

[30] Foreign Application Priority Data

Apr. 26, 1974 France .............................. 74.15155

[52] U.S. Cl. ....................... 179/15 AF; 179/15 AT; 179/15 BY
[51] Int. Cl.² ............................................ H04J 3/06
[58] Field of Search....... 179/15 AF, 15 BD, 15 BY, 179/15 BS, 15 AT

[56] References Cited
UNITED STATES PATENTS

| | | | |
|---|---|---|---|
| 2,861,128 | 11/1958 | Metzger.......................... | 179/15 BD |
| 3,109,897 | 11/1963 | Carbrey.......................... | 179/15 AF |
| 3,575,557 | 4/1971 | McCowen.............................. | 179/15 |

OTHER PUBLICATIONS

Electronics and Communication in Japan; vol. 52–A, No. 11, 1969; "A PCM Drop–Insert Switching System . . ."

*Primary Examiner*—David L. Stewart
*Attorney, Agent, or Firm*—Delbert C. Thomas

[57] ABSTRACT

The structure described is a switching-processing node for high speed data transmission systems. Information is transmitted in time slot channels, one of which is control information. Data to be passed through a node is stripped of control characters, passed to a transmitting unit and there re-encoded with such additional data bits as needed. Data for the node is switched from an input decoder to a processor input and data for transmission is switched to a transmission unit for encoding.

A switching information control frame can be passed over the system to set the switching circuits at a node to operate at the appropriate time slots of the data frames.

4 Claims, 8 Drawing Figures

TIME DIVISION MULTIPLEX DATA TRANSMISSION SYSTEM

This invention concerns data transmission systems and, more particularly, a time-division multiplex data transmission method and system.

The time-division multiplex transmission method has been used recently in the data processing field as well as in the telephone communications field. In the latter case, the communications, or calls, are periodically sampled and the audible signal amplitude of each call is digitally encoded and transmitted in a bit sequence, for instance 7 bits, in a manner similar to that utilized in a data processing operation.

A standardized time-division multiplex transmission has been in use lately in Europe. It is the so-called Pulse-Code Modulation (PCM) system wherein the data are transmitted at a rate of 2.048 megabits/s in frames of 32 channels (which are, in the literature, also referred to as "time-slots") of 8 bits each. In each frame, one or two channels are reserved for the Contractor of the transmission medium (in France, the French Minister of Post and Telecommunications); namely, channel 0 is reserved for synchronization purposes and channel 16 is, for signalization purpose, in a telephone system.

The PCM transmission mode is particularly adapted for data transmissions between transmission units which are remotely positioned with respect to one another. In such a system, the main transmission line (a both-way transmission line) over which the data are routed in the PCM mode at a rate of 2.048 megabits/s links the transmission network switching nodes of main towns, (for instance, Paris, Lyon, Marseille, Nice) to one another. Each switching node is connected to one or several transmission units by means of auxiliary lines and the transmission rate over these auxiliary lines is normally lower than the PCM rate utilized over the main line. The transmission units can be central processing units, data concentrators, telephone exchanges, or any similar unit which can transmit data in the digital form.

In the asynchronous type transmission systems, the synchronization for a given channel is obtained from the data received in each switching node. Also, because of the possible variations in the transmission rates from one switching node to another one, the rate used for routing the data should be lower than that used for the bits in the channels in order to avoid any possible loss of the data bits. This is achieved by the "stuffing" and "destuffing" technique disclosed, for instance, in French Pat. No. 2,025,897. In such a technique, each channel is comprised of a number of data bits, or significant bits, less than 8, i.e., lower than the channel capacity. The remaining positions in the channels are occupied with bits set at 0, except for that position which precedes the first data bit. This position is occupied by a flag bit 1 which is used for the generation of synchronization at each switching node. For instance, the number of the significant bits can be at an average of 6 bits per each channel. That is, in some frames, the channel will be comprised of two bits 0 followed with one bit 1 which is itself followed with five data bits whereas in other frames, the same channel will be comprised of one bit 1 followed with 7 data bits, and most of the frames will include channels comprised of a single bit 0 followed with one bit 1 and with six data bits.

In those systems, each switching node is provided with input adapters and output adapters, an input adapter being most of the time coupled with an output adapter in order to form an adaptive assembly for a given channel. The node includes as many input adapters as there are channels in one frame and, of course, it includes the same number of output adapters, in the output line. But, in addition, the node is provided with adapters at the ending of the auxiliary lines connecting the node to the local processing units.

These adapters are mainly channel synchronization and stuffing-destuffing devices. Each input adapter, indeed, proceeds to the destuffing operation of the channel, i.e., it retains only the significant bits of the corresponding channel that are either assigned to a local processing unit connected to the switching node through an auxiliary line, or simply in transit at the switching node. In both cases, the output adapter proceeds to the stuffing operation of the channel by causing the number of significant bits in the channel to vary in order to have the bit rate coincident either with the channel rate in the auxiliary line, in the first case, or with the PCM channel rate, in the second case.

When a channel is assigned to a local processing unit served by an auxiliary line, the corresponding input adapter, on the main line side, is connected to the output adapter, on the auxiliary line side, through the intermediary of a switching matrix of the type disclosed in French Pat. No. 71 12784. The same holds true for the connection between the input adapter of an auxiliary line and an ouput adapter of the main line. The switching matrix, therefore, performs the space switching between the channels and the auxiliary lines.

Therefore, it can be seen that such a switching node includes as many input or output adapters as there are data channels in the frame in the main line. In the case of a PCM connection, thirty input adapters and thirty output adapters are necessary.

In addition, such a switching node necessitates a switching matrix which, as a matter of fact, makes use of very few crosspoints since the number of the channels assigned to local transmission units is small with respect to those channels which are only in transit in the switching node.

At the initiating end of a network including switching nodes according to this invention, there is found a system having a first unit, namely the switching frame generator, which generates the switching frame including character SYNC II and data bits. Since this frame is to be introduced into the PCM frame which includes a character SYNC I and stuffing bits, the data bits of this first unit will be transmitted only at a frequency lower than the PCM frequency. In general, there is needed an oscillator OSC1 having a frequency of about 1.9 MHz.

Then the switching frame data is transmitted to the PCM frame generator which is a unit identical to the first one, but generating the PCM frame on line L. This unit requires an oscillator at a frequency of 2.048 MHz.

This type of unit is a basic framing unit according to CCITT recommendation G 732 such as the framing unit of the IBM Model 3971 modem, as described in chapters 2, 3, 4 of the IBM publication "IBM 3971 PCM Theory of Operation", publication Y12-853, available through Special Engineering Department of IBM France at La Gaude, France.

The main object of this invention is a less complex transmission system wherein each switching node necessitates only one input adapter and one output adapter.

Another object of this invention is the provision of a transmission system wherein a switching node necessitates no switching matrix.

These objects, and others, are achieved due to a transmission system wherein each switching node is considered as a single local processing unit to which all the contents of the transmission frame is assigned. To this end, this frame includes one synchronization character for the transmission frame followed with a "high speed" channel in which stuffing bits and one flag bit "1" have been inserted, as they are in a channel of a conventional PCM frame. The data bits, when not allowing for the stuffing bits and the synchronization character of the transmission frame, are divided into switching frames including, each, one switching frame synchronization character followed with data sub-channels of variable lengths and the addresses of which are determined by the positions they occupy in the switching frame with respect to the synchronization character of the switching frame.

This invention will be further explained, by way of a non-limitative example, with reference to the accompanying drawings.

Figure 1:
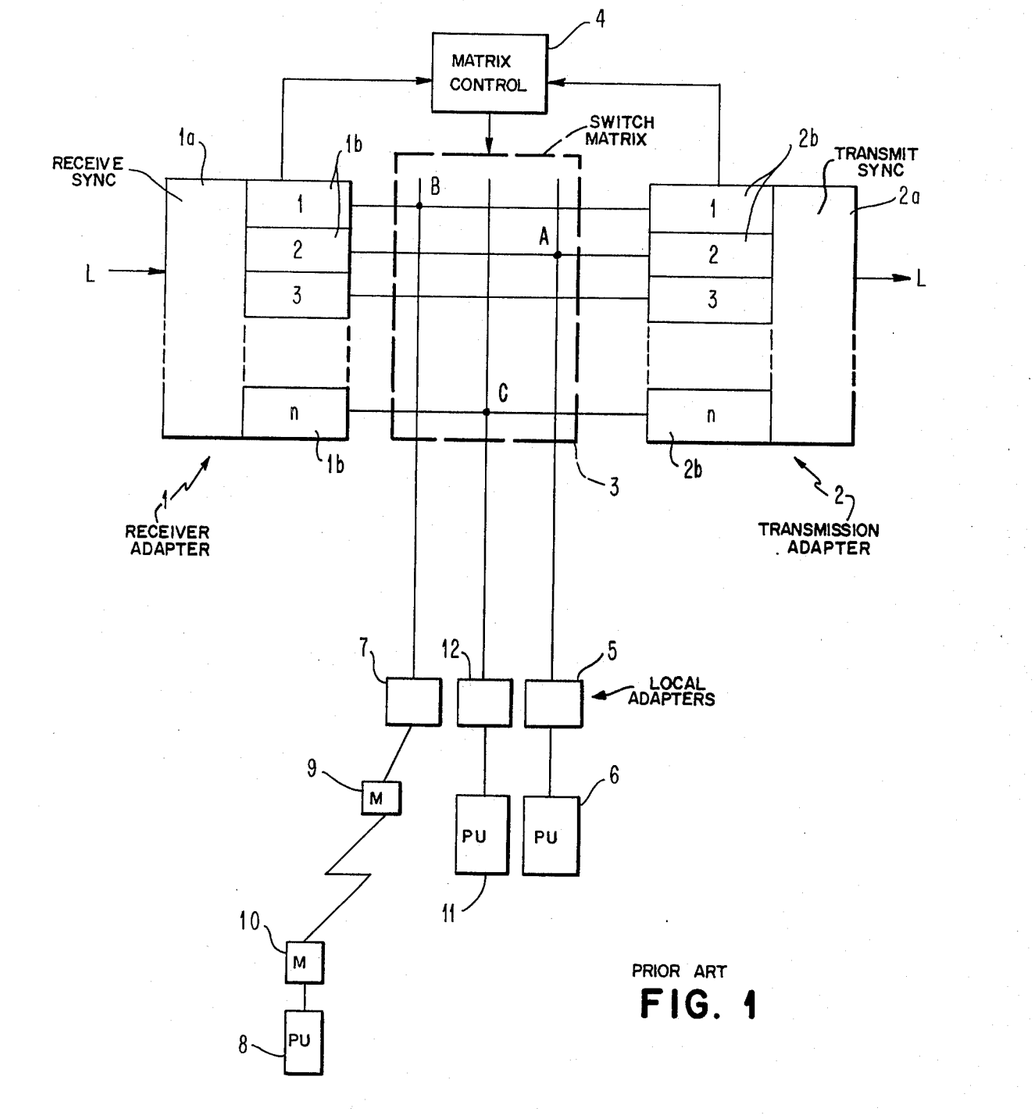
FIG. 1 is a schematic diagram of a switching node in a conventional transmission system.

In reference to FIG. 1, there is shown a transmission system including a conventional switching node which will be first briefly described.

It is assumed that line L is a line of the type leased by the French Administration, which can route data in the PCM form. Line L goes through a switching node which includes an adaptation-reception part 1, and an adaptation-transmission part 2. Part 1 is comprised of a reception synchronizer 1a the main purpose of which is to recover the synchronization frame from the synchronization character present in the first channel. Additionally, this synchronizer makes it possible to accurately frame the data channels which immediately follow the synchronization character, form said characters, and to distribute them onto reception adapter unit 1b. In this instance, it is assumed that channel 1 is assigned to reception adapter No. 1, channel 2 is, to reception adapter No. 2, and so on, but this assumption could be otherwise. A reception synchronization of this type is described in the above noted IBM publication.

Likewise, on the transmission side, the switching node includes a transmission-adaptation portion 2 comprised of a transmission synchronizer 2a mainly in charge of preserving the sychronization of each frame, after the transmission of a preceding frame formed of channels the contents of which is supplied by transmission adapter unit 2a formed of adapters 1 through n.

Figure 2:
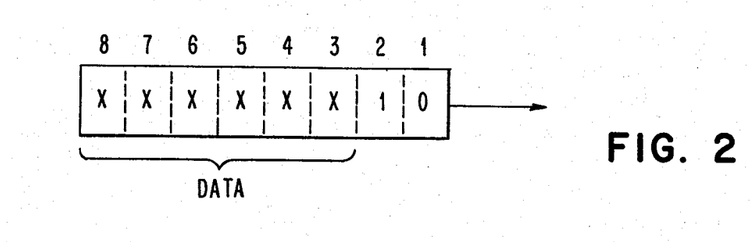
FIG. 2 is a channel of a transmission frame making use of the stuffing-destuffing method.

In reference to FIG. 2, there is shown a channel of the PCM frame received in line L. This channel which will be occupied with 8 bits, is shown as containing only 6 significant bits. Indeed, in order to avoid data losses when the transmission rate of a switching node becomes too high, each channel includes a number of data bits, the so-called "significant bits" lower than the capacity of the channel, (namely, here, 8 bits). When the channel shown in FIG. 2 is received (from right to left), by the associated reception adapter unit 1b, the adapter cancels bit 0 from position 1, but keeps in memory that position 2 is occupied with flag bit 1. Indeed, it also knows that the bits in positions 3 to 8 which follow the reference bit 1 are significant bits. It might happen that the channel includes only five significant bits; if so, the first two bits would be bits 0, and flag bit 1, then, would occupy bit position 3. Likewise, a channel with no bit 0, wherein flag bit "1" would occupy position 1, -said channel being, therefore, comprised of 7 significant bits-, would be possible.

The contents of a channel in the PCM frame can be either assigned to a local processing unit, or simply in transit through the switching node. In the latter case, the switching node acts simply as a repeating unit. Indeed, the adapter 1b (for example, the adapter for channel 3 in FIG. 1) selects the significant bits of the correponding channel, such as seen in the foregoing, and transmits them to the corresponding transmission adapter. The latter, then, proceeds to the stuffing operation of the channel, i.e., it will form anew a channel comprised of the significant bits, one flag bit 1 and bits 0 while allowing for the PCM transmission rate. For instance, the adapter may include the first data bit of the next following channel when the transmission rate is decreased, which will bring the number of significant bits in the channel to 7. Likewise, the adapter can retain the last significant bit in the channel in order to insert it into the next following channel when the transmission rate is increased, which will bring the number of the significant bits in the channel, down to 5 bits.

When the channel is assigned to a local processing unit, the switching matrix 3 is utilized. For instance, when channel 2 is assigned to processing unit 6, the switching matrix 3 includes a crosspoint A which connects reception adapter 1b for channel 2 to local adapter 5 serving the processing unit 6. In that case, local adapter 5 fulfills the same functions as the previously-described transmission adapter 1b for channel 3, i.e., it proceeds to the stuffing operation of the retransmitted channels, or else, it permanently adjusts the data transmission rate transmitted to the reception rate of processing unit 6.

The local processing unit may happen to be remotely positioned with respect to the switching node 3. For instance, in the case of channel 1, the connection achieved by crosspoint B of the switching matrix, makes it possible to route the data in channel 1 to a local adapter 7 which, in that case, is connected to its processing unit 8 through the intermediary of modems 9 and 10.

It may also happen that a processing unit, such as processing unit 11, is linked with a processing unit downstream the PCM transmission line. In that case, local adapter 12, which acts as a reception adapter, is connected to one of the transmission adapters of transmission adapter unit 2b, through crosspoint C.

The crosspoints of the switching matrix 3 are established under the control of a control unit 4. Such a control unit must be able to answer the requests for connection coming from local processing units as well as from remote processing units in the PCM transmission line. Generally, one or several of the channels are assigned thereto in a permanent manner.

FIG. 1 shows the one-way transmitting opertion (here, from left to right). It is obvious that, for a full duplex transmission system, the switching node will be provided with similar equipment including an adaptation-reception portion, a switching matrix, and an adaption-transmission portion, for the other transmitting direction (i.e., from right to left), a structure not shown in the figure.

The embodiment according to this invention will now be disclosed with reference to FIGS. 3, 4, 5 and 6.

As said in the foregoing, the PCM frame includes a "high speed channel" following the synchronization character, by analogy with the conventional channels of a PCM frame. Indeed, it has been considered that the data transmitted in the PCM mode over the line, are all assigned to the switching node, i.e., each switching node is considered as a processing unit. Consequently, as in the prior art technique, the actual data transmission rate is lower than the 2.048 megabit/s PCM rate, in order to have the data transmission rate coordinated with the PCM transmission rate. Thus, when the synchronization character in the PCM frame occupies 8 bit positions, the rate of the PCM data frame from which the synchronization character has been subtracted is 1.98 megabits/s. The data rate, then, is chosen in order to be lower than this 1.98 megabits/s rate so as to allow a given number of stuffing bits and one flag bit 1 for each frame, in a manner similar to that used for the channels of the PCM frame.

Figure 3:
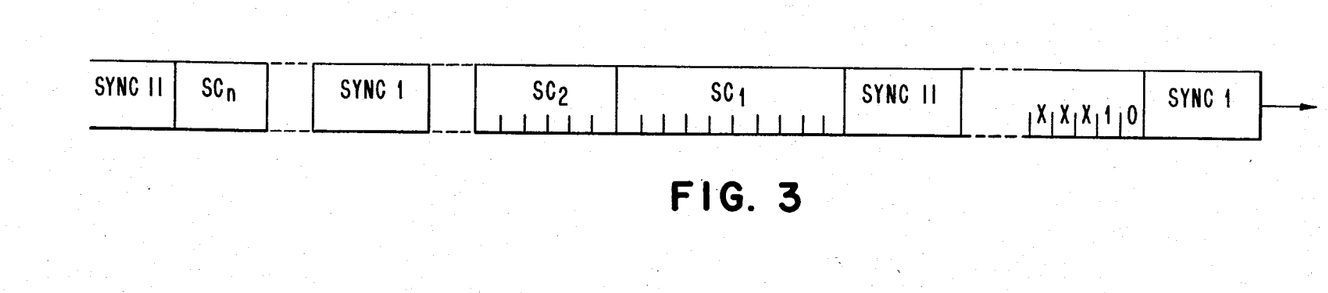
FIG. 3 is a succession of data bits showing the structures of the transmission frame and of the switching frame, according to this invention.

FIG. 3 shows the structure of the PCM frames. From right to left, according to this invention, the synchronization character (SYNC 1) is followed by the "high speed" channel which includes, first, the stuffing bit or bits. Here, only one bit "0" followed with the flag bit 1 have been represented, but as seen previously, there might be either two bits 0 or none. Then, the flag bit 1 is followed with the data bits ($x$'s in FIG. 3).

As shown in FIG. 3, another synchronization character, SYNC II, is also in the high speed channel. This synchronization character is indicative of the beginning of a frame, which is independent of the PCM frame, and which will be referred to as the "switching frame". The latter, with the exception of character SYNC II, is comprised of sub-channels SC1, SC2, . . . , SCn, which may be found in different frames, as shown in FIG. 3. Likewise, the sub-channels may be of different capacities. For instance, sub-channel SC1 is comprised of ten bit positions whereas sub-channel SC2 is comprised of six bit positions, only. It should be noted that each sub-channel includes stuffing bits and one flag bit 1 in the same manner as in a channel of a conventional PCM frame.

Therefore, it can be seen that the switching frame is quite independent of the PCM frame. For the completion of a switching frame, synchronization character SYNC 1 (and the character intended to signal whether the transmission is a telephone transmission) must be extracted from the PCM frame, as well as the stuffing bits, including the flag bit 1. The switching frame, then, is formed of those bits which remain between an included synchronization character SYNC II and the next following non-included character SYNC II.

Figure 4:
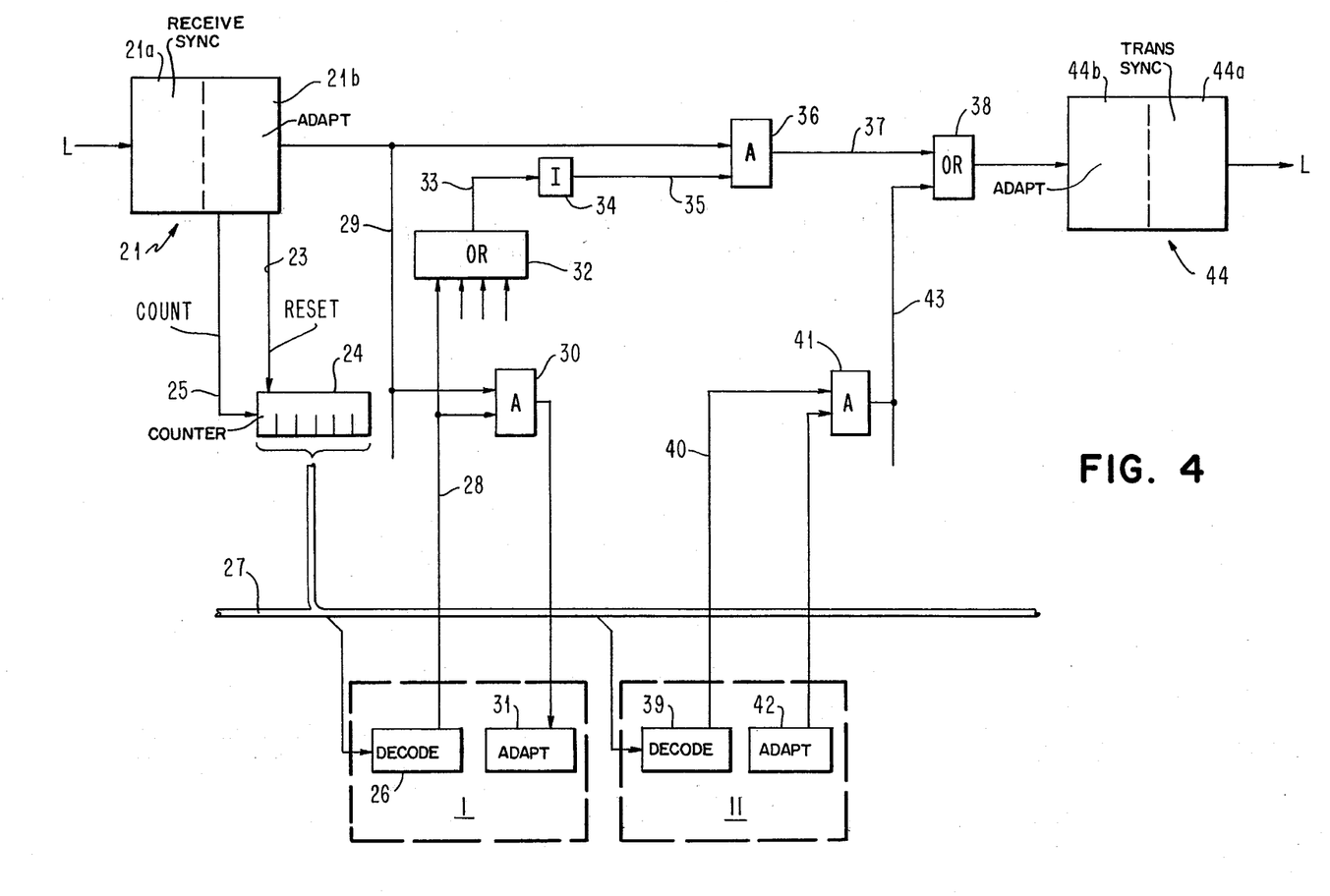
FIG. 4 is a schematic diagram of the switching node according to this invention.

FIG. 4 shows a preferred embodiment of a switching node according to this invention. The data coming from line L are received by the adaptation-reception portion 21 which is comprised of a reception-synchronizer 21a similar to that shown in FIG. 1 and a reception-adapter unit 21b an embodiment of which will be disclosed below. This unit 21b supplied the previously described switching frame over line 22. Indeed, reception synchronizer 21a, when it has detected a first synchronization character, produces an indication of the high speed channel to unit 21b which, then, proceeds to the stuffing operation of the channel before the transmission of the latter over line 22. Unit 21b proceeds also to the detection of the synchronization character SYNC II in order to reset a counter 24 incremented by the clock pulses produced over a line 25, by sending a synchronizing pulse with the last bit of character SYNC II, over another line 23. Therefore, counter 24 starts counting bits immediately after character SYNC II is detected and goes on being incremented during all the time the switching frame is operated.

By way of illustration, it is supposed that a sub-channel of the switching frame, is assigned to local processing unit 1. The latter is provided with a decoding unit 26 which is connected to a bus 27 linked to the output of counter 24. When counter 24 reaches a value corresonding to the first bit position of the sub-channel assigned to processing unit 1, decoding unit 26 produces a bit 1 over line 28. During all the time when counter 24 is counting the bit positions of the sub-channel assigned to unit 1, the decoding unit holds this bit 1 over line 28. It is only when the last bit position of the sub-channel has been detected that decoding unit 26 stops transmitting a bit 1. Therefore, the data transmitted over line 22 and sent by bus 29, can be received by processing unit 1 due to the opening of AND gate 30 which remains open all the time the assigned bits of the subchannel are being received. Then, the data bits are received by adapter 31 which proceeds to the destuffing operation, such as performed by the reception adapters shown in FIG. 1.

In order to make FIG. 4 clearer, only on processing unit with its decoding unit and its adapter, has been shown. As a matter of fact, each processing unit receiving data could be represented in a similar manner; that is to say, counter 24 is linked to each of the decoding units through the intermediary of bus 27, and the data is trnsmitted to the adapters through the intermediary of bus 29.

When the processing unit 1 receives the contents of a sub-channel, it has been pointed out that the corresponding decoding unit 26 sents a bit 1 over line 28. Line 28, as well as each of the similar lines from the decoding units of the other processing units at the node, are the input lines of OR circuit 32. Consequently, during all the time when processing unit 1, or any other processing unit at the node, not shown in the figure, is receiving data, one of the inputs of OR circuit 32 is set to 1, which causes input line 33 thereof to be set to 1. After inversion in inverter 34, a bit 0 will therefore be found at the second input 35 of AND circuit 36. In that case, a 0 is produced at input 37 of OR circuit 38. If, at that moment, no local processing unit is assigned to the sub-channel which has just been unloaded, said sub-channel is stuffed with 0's, only. It should be noted that, in order that there is no confusion between a data character comprised of 0's, only and a sub-channel with no data, an arrangement is provided so that there is no data configuration formed of more than a given number of 0's, only.

On the other hand, when the sub-channel switched over line 22 is not assigned to a local processing unit, (the switching node operates as a repeater, only), no input of OR circuit 32 is set to 1. In that case, a 0 is provided over line 33 and, after inversion by inverter 34, a bit 1 is transmitted to input 35 of AND gate 36. Therefore, the data on line 22 is transmitted to input 37 of OR circuit 38.

Save for the case when the switching node operates as a repeater, only, it may happen that some sub-channels with no data, either because they had no data during reception by the switching node, or because they were unloaded toward a local processing unit, are assigned to one or a plurality of local processing units desiring to proceed to transmisson downstream line L, such as processing unit 11. The latter is provided with a decoding unit 39 connected to counter 24 through the intermediary of bus 27. When the counter is incremented up to the bit positions of the assigned sub-channel, decoding unit 39 produces a bit 1 over line 40, thereby opening AND gate 41. The data bits coming from adapter 42, then, are transmitted to OR circuit 39, through bus 43 and, then, to the adaptation-transmission portion 44 of the switching node, which portion is comprised of a transmission adapter unit 44b which will be described further on, and a transmission synchronizer 44a.

In a way similar to that disclosed for the reception operation, a single processing unit has been shown for transmission, but it is obviously possible that several processing units proceed to send. Likewide, a processing unit can receive data from an upstream unit while it is transmitting data to a downstream unit. In that case, the same sub-channel can be utilized for both reception and transmission of the data coming from this processing unit.

FIG. 4, as shown in FIG. 1, shows only that portion of the switching node which operates upon the one-way transmitted data, i.e., from left to right. It is obvious that in a full duplex transmission-operation, an identical arrangement is provided for processing the data transmitted in the other direction (from right to left).

Figure 5:
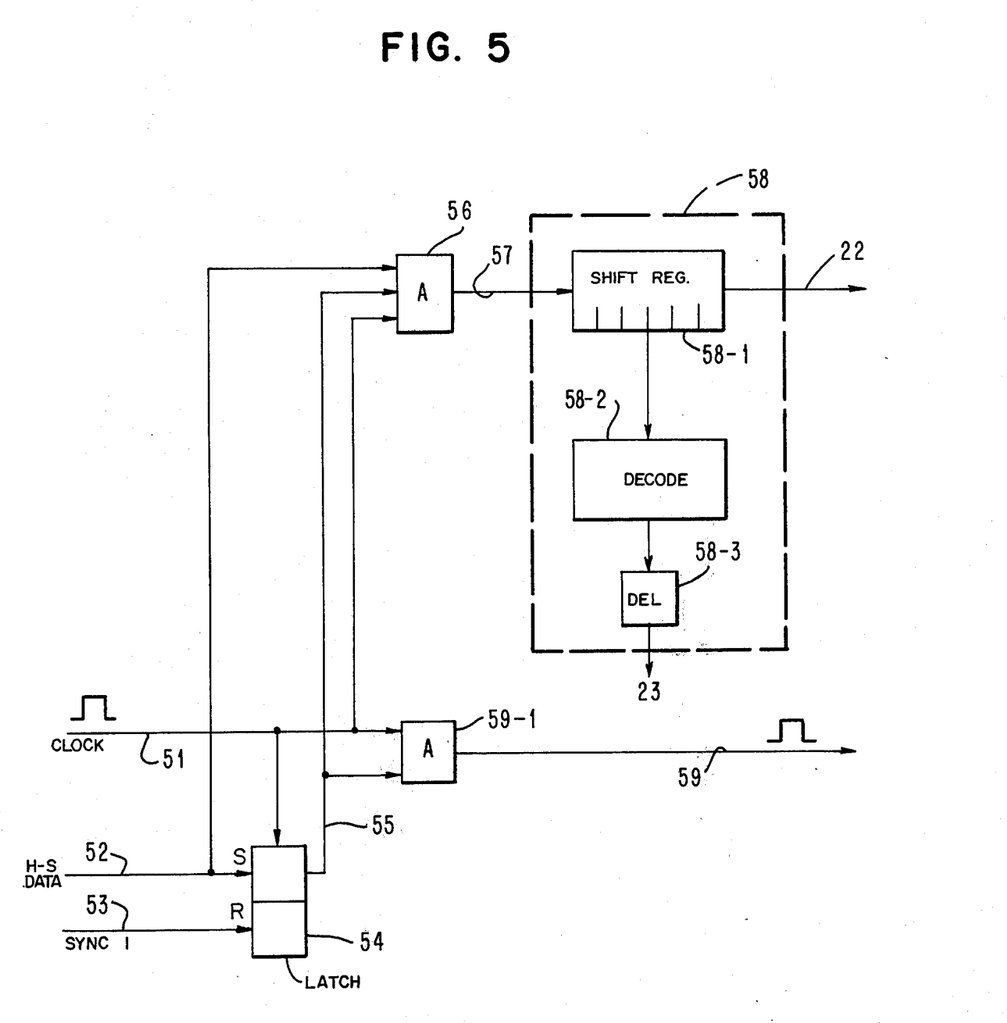
FIG. 5 is a schematic diagram of an embodiment of the reception adapter of a switching node according to this invention.

FIG. 5 is a possible form of the reception adapter unit 21b shown in FIG. 4. In this figure, three input lines have been represented which come from the reception synchronizer 21a: line 51 carries the clock signal, line 52 provides the data of the high speed channel, and line 53 produces a high pulse when character SYNC 1 is detected on the line. Thus, when the synchronization character in the PCM frame, namely SYNC 1, is received, a bit 1 is transmitted, over line 53, to the reset input of the two-input latch 54. The output 55 of latch 54, then, assumes condition 0 all during the period during which character SYNC 1 is produced, and AND circuit 56 is held nonconducting, thereby preventing character SYNC 1 from being transmitted. Then, the bits coming after character SYNC 1 are the stuffing bits 0, which, therefore have no action upon latch 54. On the other hand, flag bit 1 on line 52 which is the set input of latch 54, triggers the latter when the clock pulse is produced from line 51. Then, a bit 1 is present on line 55 which causes AND gate 56 to be conducting, thereby passing the data bits to the output 57 of AND circuit 56. It should be noted that the first bit to be transmitted is, actually, the first data bit that comes immediately after the flag bit 1 and not the latter, due to the delay of latch 54 and to the conditioning of AND gate 56 for it to gate the clock pulses from line 51. Then, the data on line 57 are transmitted to shift register 58-1. As the data are received in register 58-1, they are decoded by decoding circuit 58-2. When this circuit decodes character SYNC II, a pulse is transmitted on line 23 after being delayed in delay circuit 58-3 by a character corresponding to the switching time of character SYNC II in register 58-1. Said pulse is transmitted to counter 24 to reset it to zero as seen above. As far as clock pulses received on line 51 are concerned, they are transmitted on line 59 after removal of the pulses corresponding to character SYNC I and stuffing bits through AND gate 59-1 disabled by the 0 output on line 55 while receiving these bits.

Figure 6:
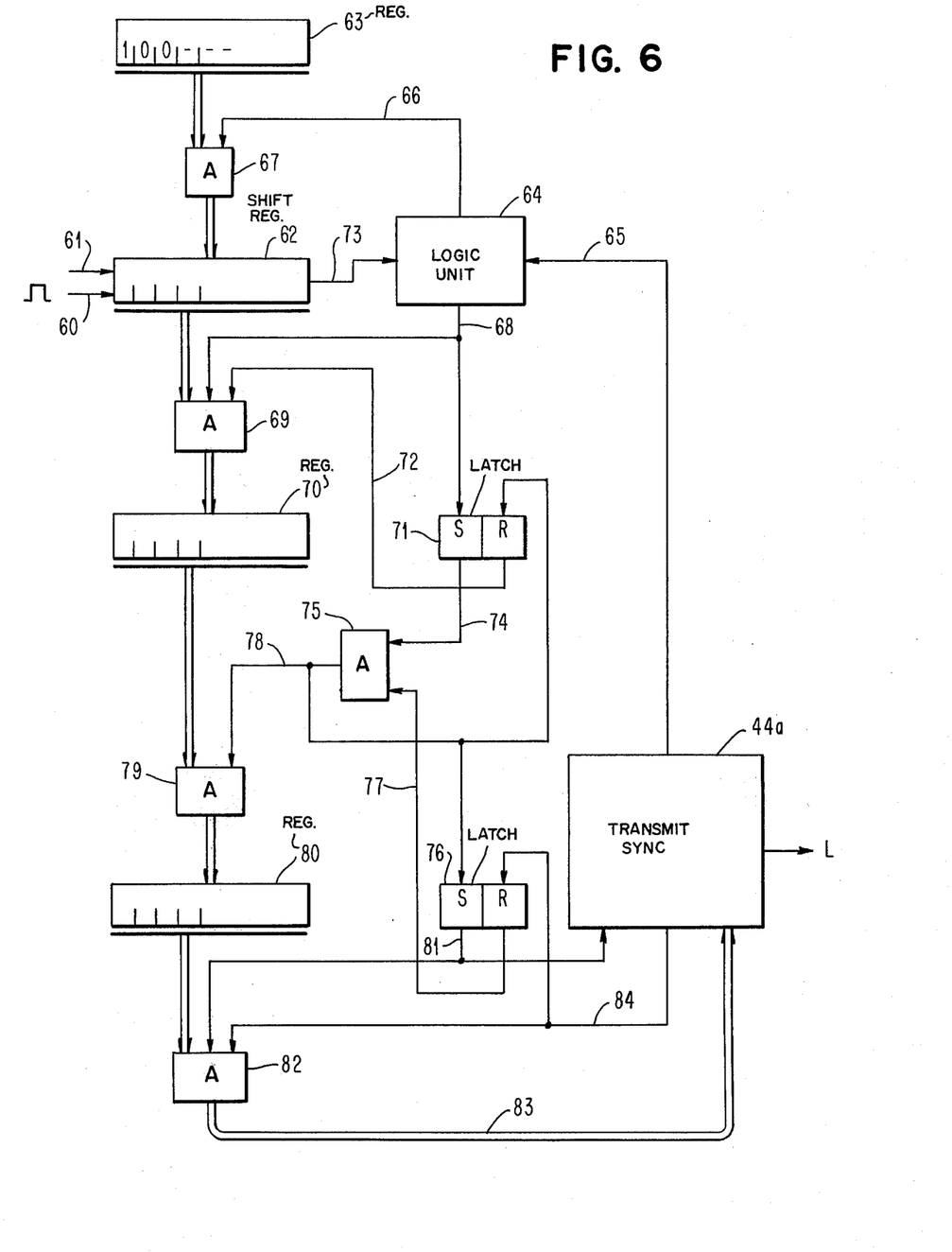
FIG. 6 is a schematic diagram of the embodiment of the transmission adapter of a switching node according to this invention.

FIG. 6 shows an embodiment of the emission adaptive unit 44b of FIG. 4. In this figure, it can be seen that the two data bits are applied through line 61 into shift register 62 the capacity of which is equal to the number of bits of character SYNC 1. A bit is loaded into register 62 each time a clock pulse is received on line 60. In order to stuff the high speed channel as described above, a register 63 with the same capacity as register 62 contains a leftmost 1 bit followed to the right by 0 bits. Each time register 63 is unloaded in parallel into register 62, the 1 bit is in the extreme left position, followed by 0 bits. As the data bits are loaded into register 62 over line 61, the 1 bit is shifted to the right. When this 1 bit is transmitted out of register 62, this indicates that said register 62 contains data bits only. At this time, the 1 bit is transmitted on line 73 to logic unit 64 which provides a pulse on line 68 to enable AND gate 69, which allows the data bits in register 62 to be loaded in parallel into register 70. Immediately after that, logic unit 64 supplies a pulse on line 66 to enable AND gate 67, which then, allows the contents of register 63 to be loaded again into register 62.

Thus, the transfer between registers 62 and 70 on the one hand and register 63 and 62 on the other hand, is carried out each time logic unit 64 receives a 1 on line 73. But this dual transfer is also carried out when a pulse is received on line 65. Said pulse is transmitted by transmission synchronizer 44a on the transmission, on line L, of the first bit of the 32nd time-slot of the PCM frame. At this time, register 62 is not completely loaded with data bits and on the right of the data, is a 1 bit and possibly one or two 0 bits. These contents which will make up the first time-slot transmitted immediately after character SYNC 1 will, thus, include the stuffing bits and "flag" bit 1 followed by data bits.

The pulse on line 68, which enables gate 69 to transfer the data into register 70, is also used to set latch 71. Due to this fact, a 0 on reset output 72 disables gate 69, which prevents the data from being transferred into register 70 as long as the contents of said register 70 is not transferred. In the same way, set output 74 of latch 71 supplies a 1 to the input of AND gate 75. Said AND gate 75 allows the passage of pulse 1 only when also receiving a positive pulse on its other input connected to reset output line 77 of latch 76. Should this case arise, i.e., if latch 76 is in the 0 or "reset" condition, gate 75 is enabled and a positive pulse is transmitted on line 78 to AND gate 79, which allows the contents of register 70 to be transferred into register 80. At the same time, the pulse on line 78 is transmitted to the reset input of latch 71 and to set input of latch 76 which are switched into the 0 and 1 conditions, respectively.

As seen above, the 1 or 0 condition of each of latches 71 or 76 indicates that each of registers 70 or 80 is full or empty. Thus, register 80 being full, latch 76 is in the 1 condition, as seen above. Therefore, a 1 bit is provided on its output 81 toward transmission synchronizer 44a on the one hand and AND gate 82, on the other hand. Then, unit 44a can receive the contents of register 82 on line 83 since gate 82 is enabled by positive pulse transmitted on line 84. This pulse is also used to reset latch 76 which, due to this fact, will allow gate 75 to be enabled and permit another transfer from register 70 to register 80.

A better understanding of the previous operations will be ensured by referring to FIG. 7 which gives the timing of the data transfers described with reference to FIG. 6. The time-slot series of the PCM frame transmitted on line L are shown on line a of FIG. 7. There are 32 time-slots, all equal in time, and time-slot 0 is reserved for character SYNC 1.

The clock signals received on line 60 are shown on line b. Said clock signals control the transfer of the data bits into register 62. But said signals issued from line 59 (FIG. 5) are fetched out of the PCM frame receiving unit of this switching node. Therefore, they are synchronized with the emission clock of the previous node and not with the emission clock of unit 44a. Since it is impossible to have two specifically identical clocks, the frequencies of said clock will be undoubtedly shifted which will appear in two different ways. First of all, the bit durations will not be exactly identical and this will involve the use of the stuffing technique which is a kind of bit regulation. Then, the bits of character SYNC 1 and the stuffing bits (which do not appear in the signals issued from line 59 of FIG. 5) of the previous frame, are shifted at each frame with respect to the bits of SYNC 1 and the stuffing bits of the latest transmitted frame. Thus, on line b, there is shown a time t (corresponding to a time-slot with 1 or 2 bits added) overriding time-slots i and i+1, during which no clock pulses are received on line 60.

Figure 7:
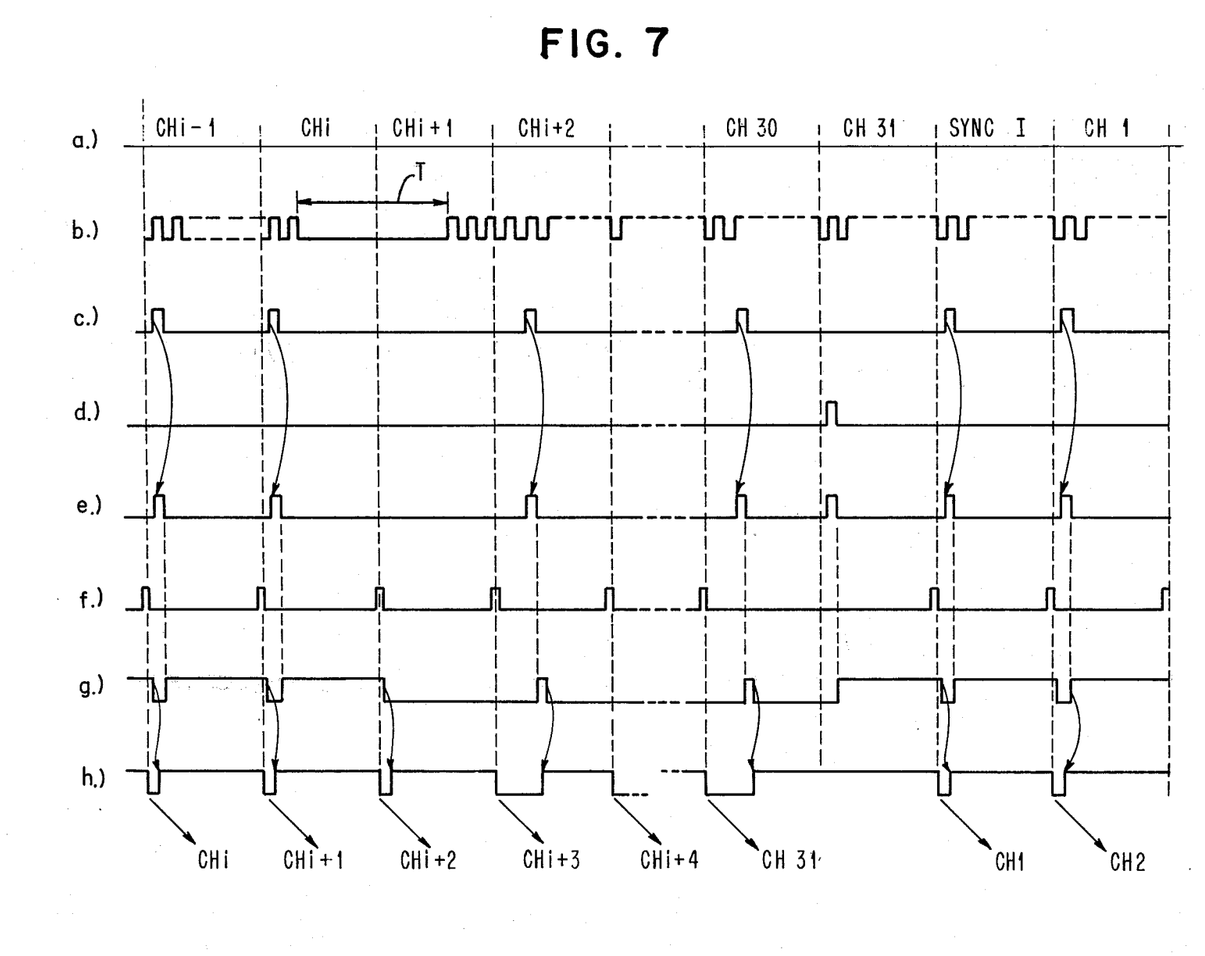
FIG. 7 is a chart showing the timing of the data transfers in the system of FIG. 6.

In FIG. 7, the overflowing pulses of register 62, transmitted on line 73, are shown on line c. Each pulse on line 73 causes pulses to be fed on lines 68 and 66 as shown on line c while line d represents the pulse received on line 65 at the first bit of the 32nd time-slot of the PCM frame (time-slot 31). Pulses c are first generated on the first bit time of each emitted time-slot (as will be understood later). But, to time T without any clock pulse, there will be a time-slot (in this case, time-slot i+1) during which there is no pulses transmitted on line 73. This delayed pulse is generated in the next time-slot (in this case, i+2) and with a shift of 1 or 2 bits (stuffing bits) with respect to the first bit, but on the emission of the first bit time of time-slot 31, a pulse is received on line 65 (see d), which causes transfer pulses to be transmitted on lines 68 and 66 as shown in e. Then, the overflowing pulses are again generated on line 73 on the first bit time of each time-slot.

On line f of FIG. 7, are shown the pulses transmitted on line 84 by transmission synchronizer 44a, said pulses unloading in parallel register 80 for transmission on line L.

The conditions of latches 71 and 76 are shown on lines g and h, respectively, the high signal indicating that the corresponding latch is in the 1 condition and the low signal indicating that this latch is in the 0 condition. As shown on the figure, when signal g goes down, i.e., when the contents of register 70 of FIG. 6 is transferred into register 80, signal h goes high, indicating that register 80 is loaded. In the same way, signal h goes down, i.e., when register 80 is unloaded on each pulse 84 in f. It should be noted that, as shown by the arrows under line h, the contents of register 80, when it is transferred to unit 44a, makes up the time-slot data which will be transmitted a time-slot later.

Figure 8:
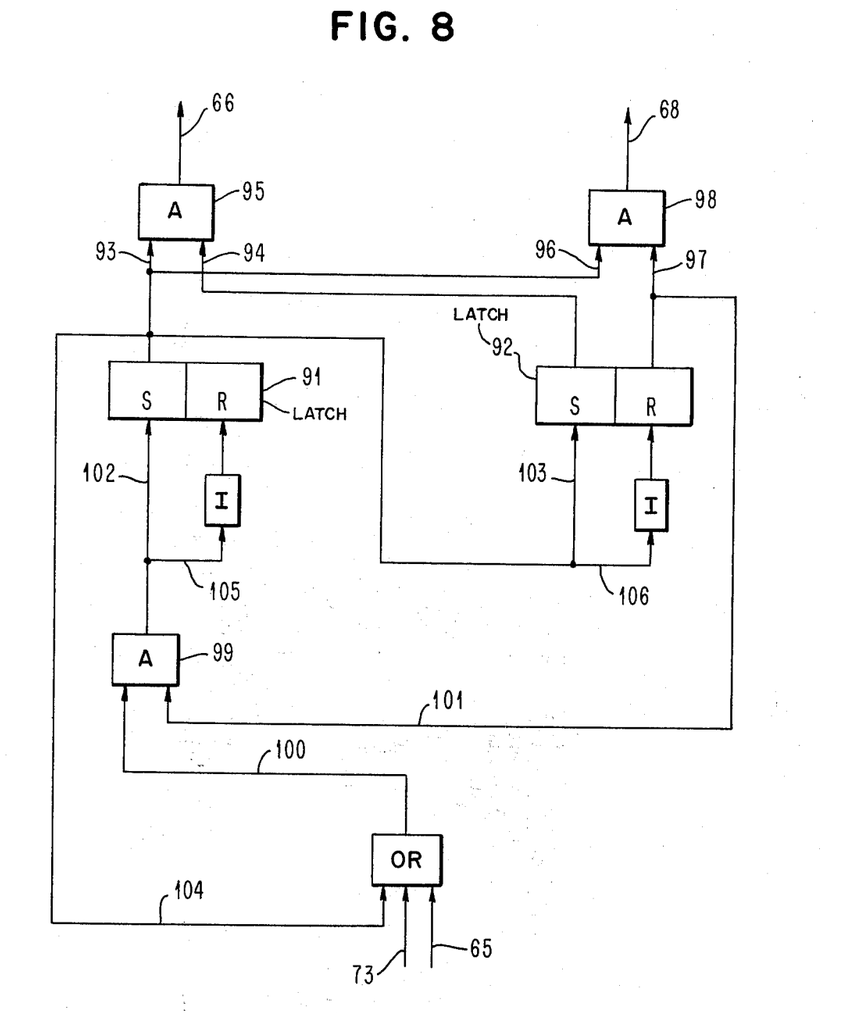
FIG. 8 is a more specific showing of the logic unit of FIG. 6.

FIG. 8 shows a possible embodiment of logic unit 64 of FIG. 6. When there have been no pulses received on input lines 73 or 65 (see FIG. 6) of OR circuit 90, latches 91 and 92 are in the reset or 0 condition. Both inputs 93 and 94 of AND gate 95 are, therefore, in the 0 position, while input 96 of AND gate 98 is in the 0 condition and its input 97, in the 1 condition. When a pulse is transmitted on either of line 73 or 65, a positive pulse is supplied on input 100 of AND gate 99, input 101 of which is already in the 1 condition due to the fact that latch 92 is in the 0 condition. Therefore, latch 91 is set by its set input 102 and a positive pulse is transmitted to input 93 of gate 95 which remains disabled since its input 94 remains at a low level and to input 96 of gate 98 which is thus, enabled and allows a pulse to be transmitted on line 68. But the change of condition of latch 91 also causes a positive pulse to be fed to set input 103 of latch 92 on the one hand, and to input 104 or OR circuit 90, on the other hand. Therefore, latch 103 is set and transmits a positive pulse to input 94 of gate 95. Although pulse 73 or 65 is terminated, a 1 is applied on input 104 or OR circuit 90, latch 91 is maintained in the set condition and the application of a 1 on input 93 of gate 95 is maintained. Therefore, the latter transmits a positive pulse on line 66. Then, latches 91 and 92 are reset due to the fact that the reset output at 0 of latch 92 is transmitted by input line 101 of gate 99 to reset input 105 of latch 91 which is reset and transmits in turn, a resetting pulse to latch 92 through its reset input 106.

In the foregoing, for both the sub-channels and the high speed channel, the stuffing bits and the flag bit 1 have been placed ahead the data. However, it is also possible to place the flag bit 1 and the stuffing bits 0 after the significant data bits. In such a case, the destuffing operation is, of course, carried out after reception of the whole channel or sub-channel.

Likewise, for illustration purposes, the transmission is carried out in the PCM mode at a rate of 2.048 megabits/s. But the invention holds true for a PCM transmission system with a different rate, and, in a general manner, for any transmission system making use of the frame and channel time-division multiplexing mode.

Though this description deals with local processing units, only, this invention is also valuable when the switching node includes links with remotely-positioned processing units and even connections with other time-multiplexing transmission lines of the type considered in the foregoing description.

It is to be understood that the preceding description has been given only as an unrestrictive example and that numerous alternatives may be made without departing from the spirit and scope of this invention.

What is claimed is:

1. A data transmission system including a number of switching nodes and data transmission lines connecting said nodes, for transmitting data by interspersed data frames and switching control frames, said system characterized in that each node includes:

reception adapter means for detecting a first synchronization character in an incoming transmission frame and for extracting data and non-significant stuffing bits from a high speed channel of said frame, said reception adapter means also including means for detecting a second synchronization character, a counter means energized by said reception adapter means upon detection of said second synchronization character, to supply the addresses of switching control frame sub-channels according to the positions of said sub-channels with respect to said second synchronization character;

means responsive to said counter means for extracting data from selected switching control frame sub-channels;

a transmission adapter means for regenerating said first synchronization character of said data frame and for thereafter transmitting both data received on selected sub-channels and data originating at each node, said transmission adapter means including a means for inserting non-significant stuffing bits into said high speed channel of frames transmitted after said first synchronization character over said transmission line.

2. A system according to claim 1 wherein said counter means consist of a counter, means to reset said counter to zero, said means activated by said reception adapter upon detection of said second synchronization character and means to increment said counter clock pulses corresponding to the significant bits in said switching frame.

3. A system according to claim 2 including a first logic means and a local processing unit including an adapter, said first logic means settable to route said data bits from said reception adapter means to the input of said local processing unit, a decoding unit in said processing unit and connected to said counter, and means activated by said decoding unit when it decodes the address in said address counter to be that of the sub-channel assigned to said processing unit to set said first logic means.

4. A system according to claim 3 including a second logic means to route the data bits coming from an output of a local processing unit to said transmission adapter means, and means activated by said decoding unit of said processing unit when it decodes the address in said address counter to be that of the sub-channel assigned to said processing unit for outputting data to said line.

* * * * *